United States Patent
Tatar et al.

(10) Patent No.: US 12,358,636 B2
(45) Date of Patent: Jul. 15, 2025

(54) AIR SUPPLY SYSTEM

(71) Applicant: TUSAS—TURK HAVACILIK VE UZAY SANAYII ANONIM SIRKETI, Kahramankazan/Ankara (TR)

(72) Inventors: Sami Burak Tatar, Kahramankazan/Ankara (TR); Burak Akgun, Kahramankazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 61 days.

(21) Appl. No.: 18/566,173

(22) PCT Filed: Jun. 6, 2022

(86) PCT No.: PCT/TR2022/050533
§ 371 (c)(1),
(2) Date: Dec. 1, 2023

(87) PCT Pub. No.: WO2022/260630
PCT Pub. Date: Dec. 15, 2022

(65) Prior Publication Data
US 2024/0262524 A1    Aug. 8, 2024

(30) Foreign Application Priority Data

Jun. 8, 2021 (TR) ............................... 2021/009357

(51) Int. Cl.
*F02C 7/04* (2006.01)
*B64D 33/02* (2006.01)

(52) U.S. Cl.
CPC ................ *B64D 33/02* (2013.01); *F02C 7/04* (2013.01); *B64D 2033/0246* (2013.01)

(58) Field of Classification Search
CPC .... F02C 7/04; B64D 33/02; B64D 2033/0246
See application file for complete search history.

(56) References Cited

U.S. PATENT DOCUMENTS

2002/0078916 A1   6/2002   Altmann et al.
2010/0065139 A1   3/2010   Osswald et al.

FOREIGN PATENT DOCUMENTS

CN           108438238 A       8/2018

OTHER PUBLICATIONS

International Search Report and Written Opinion for PCT application No. PCT/TR2022/050533, mailed Oct. 11, 2022.
(Continued)

*Primary Examiner* — David E Sosnowski
*Assistant Examiner* — Theodore C Ribadeneyra
(74) *Attorney, Agent, or Firm* — Notaro, Michalos & Zaccaria P.C.

(57) ABSTRACT

An air supply system has an air intake that provides air to an air vehicle engine. An inlet port supplies air to the air intake. First apertures on the surface of the air intake provide an uninterrupted air supply when the inlet port is blocked. A rotary cylinder is mounted to be rotatable around the air intake. The first apertures and second apertures that are on the surface of the rotary cylinder form an open position so air is introduced into the air intake and a closed position in which air supply to the air intake is blocked. An actuator triggers a first gear on the rotary cylinder to rotate around the air intake of the rotary cylinder. A second gear provides motion transmission between the actuator and the first gear. A sensor unit measures temperature, pressure, humidity and/or flow values of air passing through the air intake.

12 Claims, 4 Drawing Sheets

(56) References Cited

OTHER PUBLICATIONS

Demand/Request for International Preliminary Examination, dated Mar. 21, 2023.
Written Opinion of the International Preliminary Examining Authority dated Apr. 3, 2023.
Applicant Response to the Written Opinion of the International Preliminary Examining Authority, dated May 24, 2023.
International Preliminary Report on Patentability, completed on Jun. 6, 2023.
International Application Status Report—generated Nov. 20, 2023.

AIR SUPPLY SYSTEM

FIELD

This invention relates to an air supply system located on air vehicles to provide external air intake to the engines of air vehicles.

BACKGROUND

In air intakes that provide air supply to air vehicle engines, blockage may take place depending on the duration of use of the air vehicle and the ambient conditions to which it is exposed. Blockage taking place in air intakes may cause a power loss in the engines of air vehicles and thus lead to an emergency landing of the air vehicle or to accidents.

The People's Republic of China utility model document CN208149631U, which is included in the known state of the art, describes suction openings used as an alternative in the event of blockage takes place in air intakes on air vehicles. In case of emergency, a pilot moves these suction openings manually with the help of a wire to open or close the same.

SUMMARY

Thanks to an air supply system developed by this invention, a blockage in the air intake is detected quickly by a control unit so that an automatic measure is taken.

Another object of this invention is to reduce the burden on the pilot and to ensure the flight safety of the air vehicle by developing a system that makes automatic and rapid decisions against a blockage occurring in an air intake.

A further object of this invention is to supply the engine of the air vehicle with a required amount of air in line with the operating conditions in a regular and controlled manner so as to provide a sufficient air flow.

An air supply system realized to achieve the object of the invention, defined in the first claim and in the claims dependent on this claim, comprises at least one air intake enabling ambient air to reach the engine in air vehicles which can be in the form of an aircraft or an unmanned aerial vehicle, at least one inlet port providing air supply to the air intake, at least one first aperture situated radially on the air intake, providing air supply into the air intake in case a blockage occurs in the inlet port due to icing, dusts and/or particles in the air, at least one rotary cylinder having a radius greater than that of the air intake, a nested configuration with the air intake and mounted so as to be rotatable around the air intake, at least one second aperture radially situated on the rotary cylinder and providing air supply into the air intake, an open position (I) in which the first aperture and the second aperture are almost completely overlapped, a closed position (II) to which the rotary cylinder is moved from the open position (I) and in which there is no air supply into the air intake from the first aperture and the second aperture, at least one first gear situated on the rotary cylinder, an actuator triggering the first gear so that the rotary cylinder is moved around the air intake, at least one second gear situated opposite the first gear and providing motion transmission between the actuator and the first gear, and at least one sensor unit measuring some flow parameters of the air that passes through the air intake, such as temperature, pressure, humidity and/or flow rate.

The air supply system according to the invention comprises a control unit that detects the presence of any blockage in the inlet opening in case the pressure according to the data sent from the sensor unit in the air intake exceeds a user-predetermined pressure, triggers the actuator when blockage is detected and brings the rotary cylinder from the closed position to the open position (I) to enable an uninterrupted air flow into the engine.

In an embodiment of the invention for the air supply system, the control unit determines any additional air demand in the engine of the air vehicle according to the operating conditions of the air vehicle, and accordingly, and/or in accordance with user-predetermined operating scenarios, brings the rotary cylinder into the open position (I), closed position (II) or to an intermediary position (III), in which the first aperture and the second aperture partially overlap.

In an embodiment of the invention for the air supply system, at least one filter is situated between the air intake and the rotary cylinder, wherein the control unit determines a blockage value of the filter by making a comparison on some air flow parameters such as the flow rate, pressure etc. towards the engine in the open position (I) and in similar operating conditions in which the air vehicle is operated, and it sends information to the user that the filter is blocked when the filter is blocked or when the air flow parameters towards the engine in the open position and under certain operating conditions are below some user-determined values.

In an embodiment of the invention for the air supply system, the first gear is removably mounted onto the rotary cylinder by means of a mechanical connector, such as a screw.

In an embodiment of the invention for the air supply system, the first gear is in the form of a half moon gear.

In an embodiment of the invention, the air supply system comprises a chamber in which the actuator is situated and at least one flange enabling the air intake to be fixed to the air vehicle and coupled to the chamber by a welding like method.

In an embodiment of the invention, the air supply system comprises at least one stopper extending outwardly on the flange and limiting the movement of the rotary cylinder.

In an embodiment of the invention, the air supply system comprises at least one carrier clamp that prevents the vibration of the sensor unit and thus protects the data transmitted to the control unit from distortion, surrounds the air intake and is mechanically fixed to the flange.

In an embodiment of the invention for the air supply system, the first apertures are spaced evenly along the periphery of the air intake and second apertures are spaced evenly on the rotary cylinder so as to be opposed to the first apertures.

In an embodiment of the invention for the air supply system, the filter extends along the inner surface of the air rotary cylinder between the rotary cylinder and the air intake, is in the form of a cylinder and is removably mounted to the air intake.

In an embodiment of the invention for the air supply system, the filter is made of a steel woven wire cloth.

In an embodiment of the invention, the air supply system comprises a sensor unit situated radially on the air intake to read some parameters of the air flow received from the inlet port, the first aperture and the second aperture.

BRIEF DESCRIPTION OF THE DRAWINGS

The air supply system realized to achieve the object of this invention is shown in the attached figures, wherein from these figures.

Figure 1:
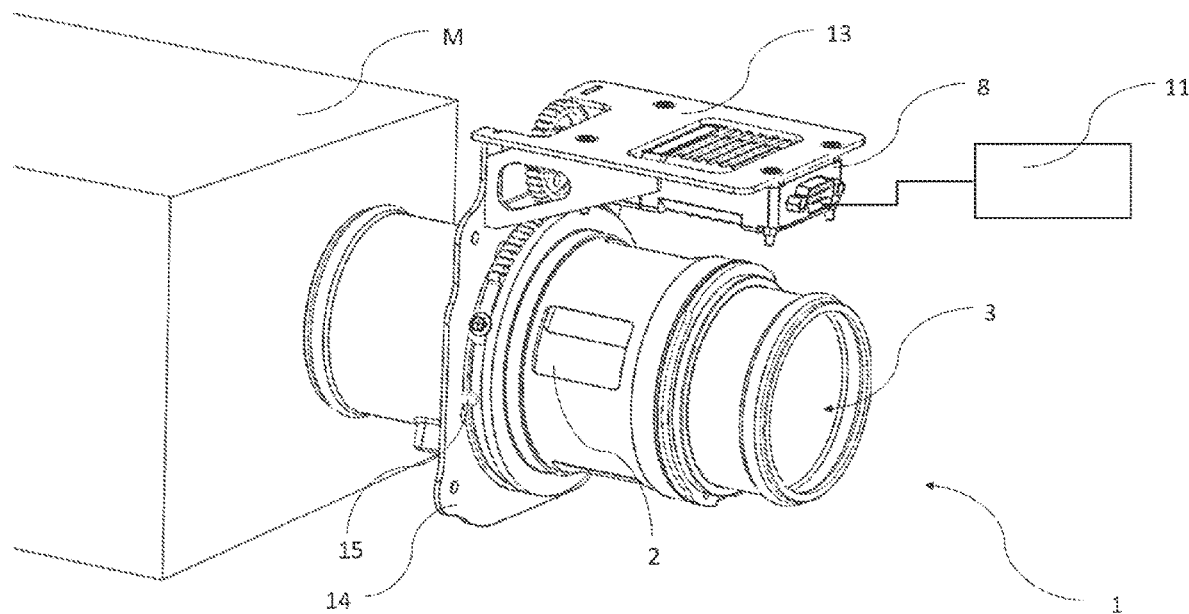
FIG. 1 is a perspective view of an engine and an air supply system.

The parts illustrated in figures are individually assigned a reference numeral and the corresponding terms of these numbers are listed below.
1. Air supply system
2. Air intake
3. Inlet port
4. First aperture
5. Rotary cylinder
6. Second aperture
7. First gear
8. Actuator
9. Second gear
10. Sensor unit
11. Control unit
12. Filter
13. Chamber
14. Flange
15. Stopper
16. Clamp
(M) Engine
(I) Open Position
(II) Closed Position
(III) Intermediate Position

DETAILED DESCRIPTION

Figure 2:
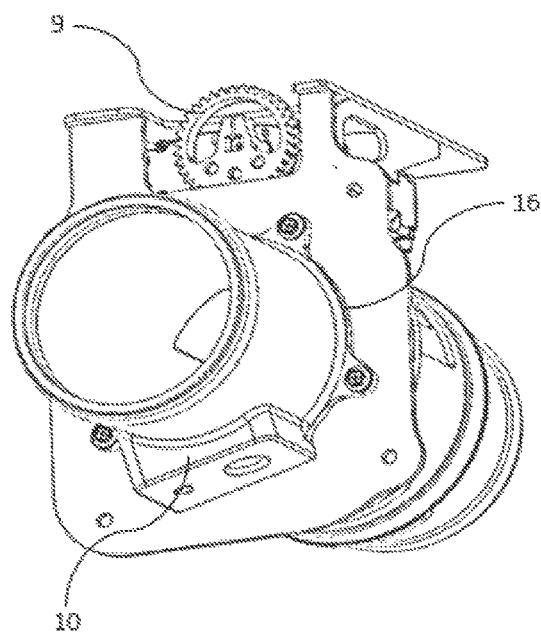
FIG. 2 is a perspective view of a sensor unit and a clamp.

An air supply system (1) comprises at least one air intake (2) in a cylindrical form configured to extend outwardly from an engine (M) of an air vehicle and providing air supply into the engine (M) in air vehicles, an inlet port (3) through which air supply takes place into the air intake (2), a plurally first aperture (4) situated on the surface of the air intake (2), enabling an uninterrupted air supply into the air intake (2) when the inlet port (3) is blocked, at least one rotary cylinder (5) having a radius larger than that of the air intake (2), a nested configuration with the air intake (2) and mounted so as to be rotatable around the air intake (2), a plurally second aperture (6) on the surface of the rotary cylinder (5), an open position (I) in which the first apertures (4) and the second apertures (6) are mutually opposed so that air is introduced into the air intake (2), a closed position (II) to which the rotary cylinder (5) is rotated from the open position (I) and in which air supply to air intake (2) is prevented from the first apertures (4) and the second apertures (6), at least one first gear (7) situated on the rotary cylinder (5), an actuator (8) that triggers the first gear (7) and rotates the rotary cylinder (5) around the air intake (2), at least one second gear (9) which provides motion transmission between the actuator (8) and the first gear (7) and is situated opposite the first gear (7), and at least one sensor unit (10) measuring the temperature, pressure, humidity and/or flow rate of the air passing through the air intake (2). (FIG. 1, FIG. 2)

The air supply system (1) according to the invention comprises a control unit (11) is configured to detect any blockage in the inlet opening (3) according to the data it receives from the sensor unit (10), to trigger the actuator (8) when the blockage is detected in the inlet opening (3) and allows air to enter into the engine (M) by moving the rotary cylinder (5) from the closed position (II) to the open position (I). (FIG. 1, FIG. 2)

At least one first aperture (4) is provided on the air intake (2), enabling additional air to be supplied to the air intake (2). The rotary cylinder (5) is rotatably mounted to the air intake (2) to control the air taken from the first aperture (4) to the air intake (2) By means of the second apertures (6) on the rotary cylinder (5), when any blockage occurs in the inlet opening (3), the position of the second apertures (6) is changed with respect to the first apertures (4) and air flow into the air intake (2) is either provided or prevented. This positional change is effected by means of the first gear (7) provided in the rotary cylinder (5), the actuator (8) triggering the first gear (7), and the second gear (9) providing transmission between the actuator (8) and the first gear (7).

The air flow values in the air intake (2) as detected by means of the sensor unit (10) are evaluated by the control unit (11) and any blockage in the inlet port (3) is automatically detected. Thus, a quick intervention is performed in the air supply by means of the control unit (11) once a blockage is detected, thereby providing uninterrupted air supply to the aircraft engine (M).

Figure 5:
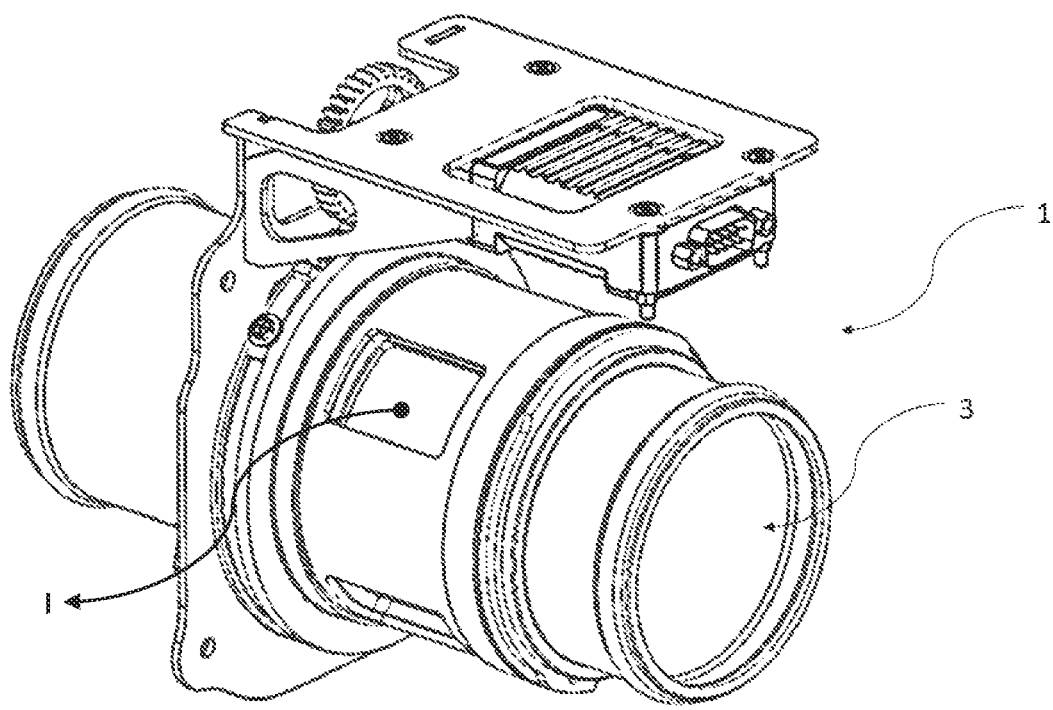
FIG. 5 is a perspective view showing the air supply system in the open position (I).
Figure 6:
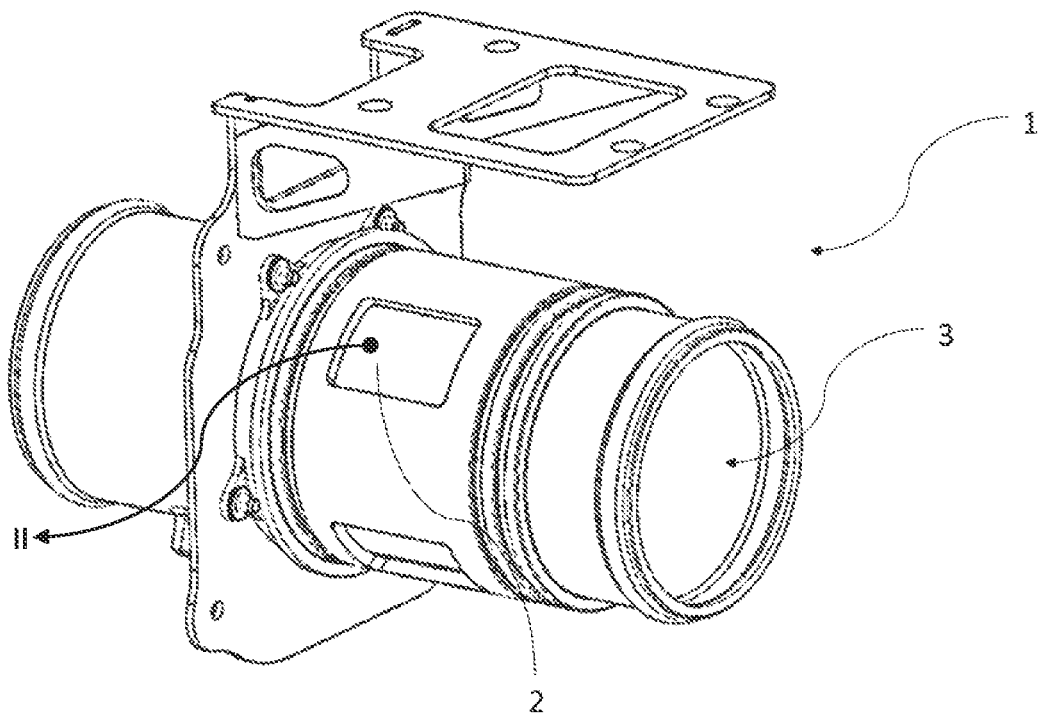
FIG. 6 is a perspective view showing the air supply system in the closed position (II).
Figure 7:
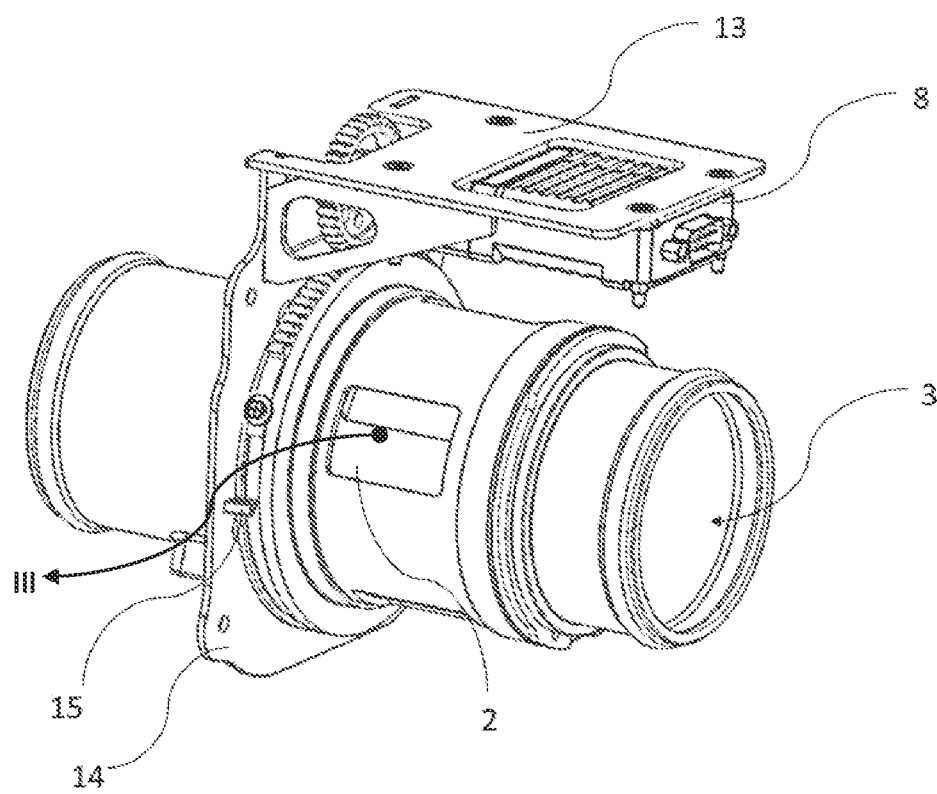
FIG. 7 is a perspective view showing the air supply system in the intermediate position (III).

In an embodiment of the invention for the air supply system (1), the control unit (11) is configured to determine any additional air demand in the engine (M) of the air vehicle according to the operating conditions of the air vehicle, and accordingly, and/or in accordance with user-predetermined operating scenarios, to bring the rotary cylinder (5) into the open position (I), closed position (II) or an intermediary position (III), in which the first apertures (4) and the second apertures (6) partially overlap. In this way, the air flow entering the engine (M) is monitored in all operating conditions and the optimum air flow is taken into the engine according to the operating conditions. In addition, this situation enhances the flight performance of the air vehicle. (FIG. 5, FIG. 6, FIG. 7)

Figure 4:
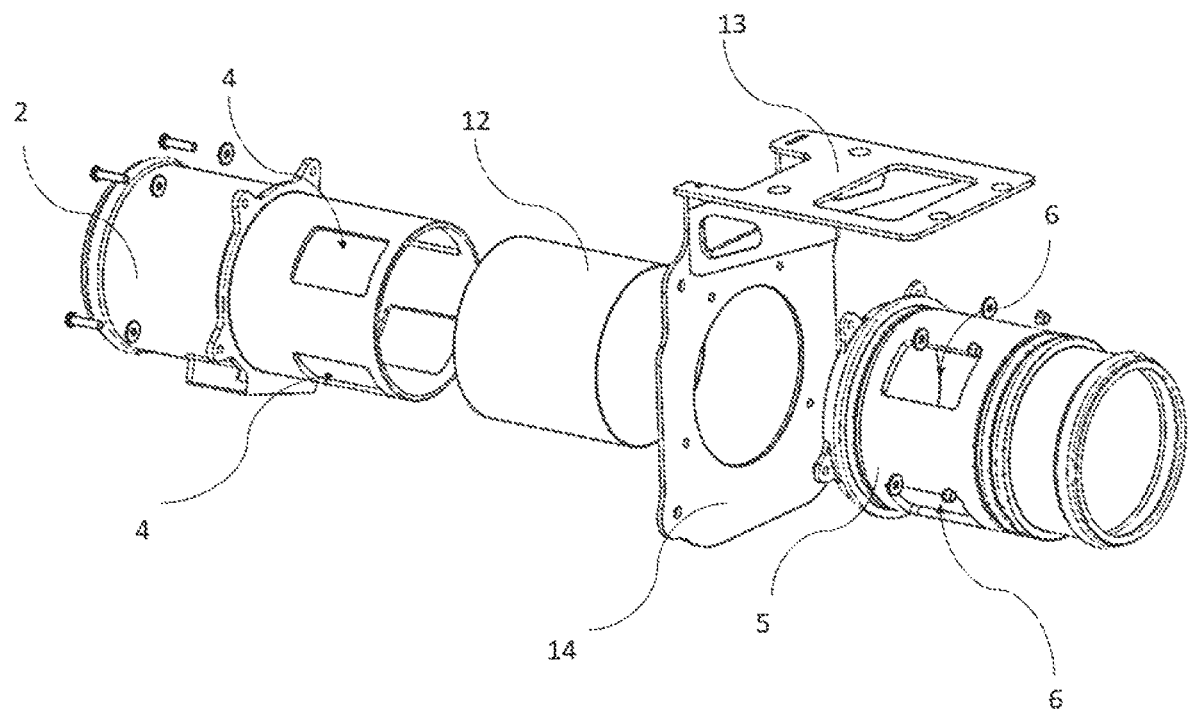
FIG. 4 is a perspective view of a filter, flange and chamber.

In an embodiment of the invention, the air supply system (1) comprises at least one filter (12) situated between the air intake (2) and the rotary cylinder (5), wherein the control unit (11) is configured to determine a blockage value of the filter (12) by comparing some air flow parameters towards the engine (M) in the open position (I) and in similar operating conditions in which the air vehicle is operated, and when the filter (12) is blocked or the blockage reaches a user-determined amount, it alerts the user accordingly. Under similar operating conditions (temperature, altitude, etc.), it is brought to the open position (I) in which the first aperture (4) and the second aperture (6) are almost completely opposed and the air flow values in this position are recorded by the control unit (11). By comparing the air flow or pressure values recorded for similar operating conditions, the amount of blockage in the filter (12) can be determined by the control unit (11) according to the changes in these values. In this way, in emergency situations such as the blockage of the inlet port (3), the lack of air flow through the first aperture (4) due to the blockage of the filter (12) and therefore insufficient air flow to the engine (M) are prevented. (FIG. 4)

Figure 3:
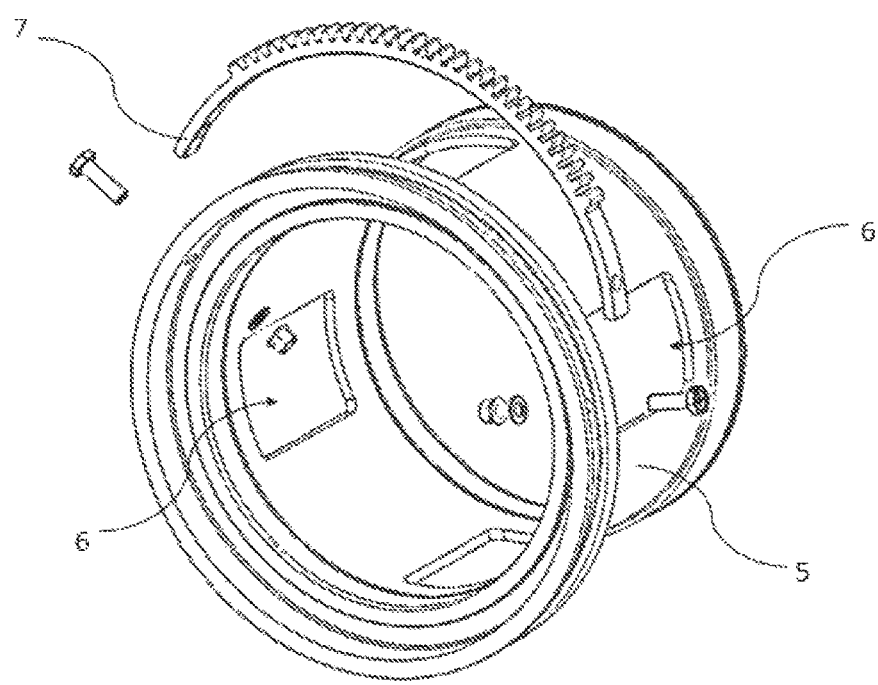
FIG. 3 is a perspective view of a rotary cylinder, a first gear and a second aperture.

In an embodiment of the invention for the air supply system (1), the first gear (7) is removably mounted onto the rotary cylinder (5). In this way, different gears can be used in the rotary cylinder (5), and maintenance and repair operations of the air supply system (1) are facilitated. (FIG. 3)

In an embodiment of the invention for the air supply system (1), the first gear (7) has a shape of a half moon.

In an embodiment of the invention, the air supply system (1) comprises a chamber (13) in which the actuator (8) is placed, and at least one flange (14) enabling the air intake (2) to be fixed to the air vehicle and mechanically coupled with the chamber (13).

In an embodiment of the invention, the air supply system (1) comprises at least one stopper (15) extending outwardly on the flange (14) and limiting the movement of the first gear (7). Thanks to the stopper, the rotary cylinder (5) can only be displaced between certain angles.

In an embodiment of the invention, the air supply system (1) comprises at least one carrier clamp (16) that prevents the vibration of the sensor unit (10) on the air intake (2) and thus prevents the distortion of the data sent to the control unit (11), surrounds the air intake (2) and is mechanically fixed to the flange (14).

In an embodiment of the invention for the air supply system (1), the first apertures (4) are spaced evenly along the circumference of the air intake (2) and the second apertures (6) are spaced evenly along the circumference of the rotary cylinder (5). In this way, radial air supply is provided to the air intake (2) from different angles along the circumference of the air intake (2).

In an embodiment of the invention, the air supply system (1) comprises a filter (12) extending along the rotary cylinder (5) between the rotary cylinder (5) and the air intake (2), said filter having the form of a cylinder and being removably mounted. Thanks to the fact that the filter (12) is in the form of the air intake (2), the filter (12) can be easily placed in and removed from the air intake (2).

In an embodiment of the invention, the air supply system (1) comprises a filter (12) in the form of a steel woven wire cloth.

In an embodiment of the invention, the air supply system (1) comprises a sensor unit (10) situated on the air intake (2) to read the air flow values after the inlet port (3), the first aperture (4) and the second aperture (6) in the air flow direction. In this way, the sensor unit (10) can take the air flow values from all inlets.

The invention claimed is:

1. An air supply system comprising:
   an air intake in a cylindrical form configured to extend outwardly from an engine of an air vehicle and providing air supply into the engine in air vehicles;
   an inlet port through which air supply takes place into the air intake;
   a plurality of first apertures situated on a surface of the air intake providing uninterrupted air flow to the air intake when the inlet port is blocked;
   at least one rotary cylinder having a radius larger than that of the air intake and a nested configuration with the air intake and mounted so as to be rotatable around the air intake;
   a plurality of second apertures on a surface of the rotary cylinder, the plurality of first apertures and the plurality of second apertures forming an open position in which the first apertures and the second apertures are opposed to each other so that air is introduced into the air intake and a closed position to which the rotary cylinder is rotated from the open position and in which air flow to the air intake is prevented through the first apertures and the second apertures;
   an actuator that rotates the rotary cylinder around the air intake;
   at least one sensor unit measuring temperature, pressure, humidity and/or flow values of the air passing through the air intake;
   at least one first gear situated on the rotary cylinder and triggered by the actuator;
   at least one second gear which provides motion transmission between the actuator and the first gear and which is situated opposite the first gear; and
   a control unit configured to detect any blockage in the inlet port according to data received from the sensor unit, to trigger the actuator when the blockage is detected in the inlet port and to allow air to enter into the engine by moving the rotary cylinder from the closed position to the open position.

2. The air supply system according to claim 1, wherein the control unit is configured to determine any additional air demand in the engine of the air vehicle according to operating conditions of the air vehicle, and accordingly, and/or in accordance with user-predetermined operating scenarios, to bring the rotary cylinder into the open position, the closed position or an intermediary position, in which the first apertures and the second apertures partially overlap.

3. The air supply system according to claim 1, comprising at least one filter situated between the air intake and the rotary cylinder, wherein the control unit is configured to determine a blockage amount of the filter by making comparison on some air flow values to the engine in the open position and in similar operating conditions in which the air vehicle is operated, and to alert a user accordingly when the filter is blocked or the blockage reaches a user-determined amount.

4. The air supply system according to claim 3, wherein the filter extends along the rotary cylinder between the rotary cylinder and the air intake, said filter having the form of a cylinder and being removably mounted.

5. The air supply system according to claim 3, wherein the filter is in the form of a steel woven wire cloth.

6. The air supply system according to claim 1, wherein the first gear is removably mounted onto the rotary cylinder.

7. The air supply system according to claim 1, wherein the first gear is in the form of a half-moon gear.

8. The air supply system according to claim 1, comprising a chamber in which the actuator is placed, and at least one flange enabling the air intake to be fixed to the air vehicle and mechanically coupled with the chamber.

9. The air supply system according to claim 8, comprising at least one stopper extending outwardly on the flange and limiting movement of the first gear.

10. The air supply system according to claim 8, comprising at least one carrier clamp that prevents vibration of the sensor unit on the air intake and thus protects data sent to the control unit from distortion, surrounds the air intake and is mechanically fixed to the flange.

11. The air supply system according to claim 1, wherein the first apertures are spaced evenly along a circumference of the air intake and the second apertures are spaced evenly along a circumference of the rotary cylinder.

12. The air supply system according to claim 1, wherein the sensor unit is situated on the air intake to read the air flow values after the inlet port, the first aperture and the second aperture in the air flow direction.

* * * * *